United States Patent
Chen et al.

(10) Patent No.: US 7,728,581 B2
(45) Date of Patent: Jun. 1, 2010

(54) METHOD OF USING OSCILLOSCOPE TO TEST ROTATION SPEED OF FAN

(75) Inventors: Ying Chen, Shenzhen (CN); Jin-Liang Xiong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 262 days.

(21) Appl. No.: 11/849,305

(22) Filed: Sep. 3, 2007

(65) Prior Publication Data
US 2008/0224691 A1 Sep. 18, 2008

(30) Foreign Application Priority Data
Mar. 13, 2007 (CN) .......................... 2007 1 0200267

(51) Int. Cl.
*G01P 3/44* (2006.01)

(52) U.S. Cl. ...................................................... 324/166

(58) Field of Classification Search ....................... None
See application file for complete search history.

(56) References Cited

U.S. PATENT DOCUMENTS

| | | | | |
|---|---|---|---|---|
| 2,752,567 A | * | 6/1956 | Kinkel | 324/166 |
| 2,906,953 A | * | 9/1959 | Stadler | 324/168 |
| 5,621,159 A | * | 4/1997 | Brown et al. | 73/9 |

* cited by examiner

*Primary Examiner*—Jay M Patidar
(74) *Attorney, Agent, or Firm*—Frank R. Niranjan

(57) ABSTRACT

An exemplary method for testing rotating speed of a fan, includes the following steps: coupling a fan and a resistor in series to a power supply; coupling an oscilloscope in parallel with the resistor; plotting voltage across the resistor on a screen of the oscilloscope, and obtaining the period of the voltage according to the image; and obtaining the rotating speed of the fan.

2 Claims, 4 Drawing Sheets

METHOD OF USING OSCILLOSCOPE TO TEST ROTATION SPEED OF FAN

BACKGROUND

1. Field of the Invention

The present invention relates to a testing method, and particularly to a method for testing rotation speed of a fan.

2. Description of Related Art

In a normal electronic product such as a computer, electronic devices will generate a lot of heat during operation. If the electronic devices are continuously operated at high temperatures, they are easily damaged. Thus, to prevent such damage, a heat-dissipating fan is normally disposed in the electronic product to dissipate heat. And, the higher the rotation speed of the fan, the more heat dissipated. A conventional method to measure the rotation speed of a fan is using a tachometer, but the tachometer is an expensive cumbersome instrument.

What is needed, therefore, is a method for testing rotation speed of a fan, which overcomes the above-described deficiencies.

SUMMARY

An exemplary method for testing rotating speed of a fan comprises the following steps: coupling a fan and a resistor in series between two ends of a power supply; coupling an oscilloscope in parallel with the resistor, the oscilloscope is used to plot an AC voltage signal to obtain the rotating speed of the fan.

Other advantages and novel features will become more apparent from the following detailed description when taken in conjunction with the accompanying drawings, in which:

DETAILED DESCRIPTION

Oscilloscopes are widely used in the manufacture of motherboards. A method of an embodiment of the present invention uses the oscilloscope to test rotation speed of a fan used in a computer.

Figure 1:
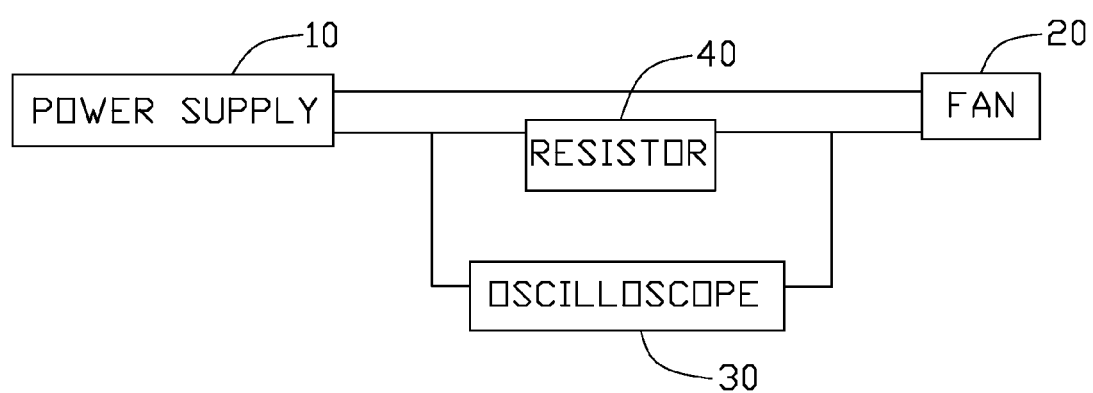
FIG. 1 is a schematic circuit diagram showing a method for testing rotation speed of a fan according to an embodiment of the present invention, utilizing an oscilloscope.
Figure 2:
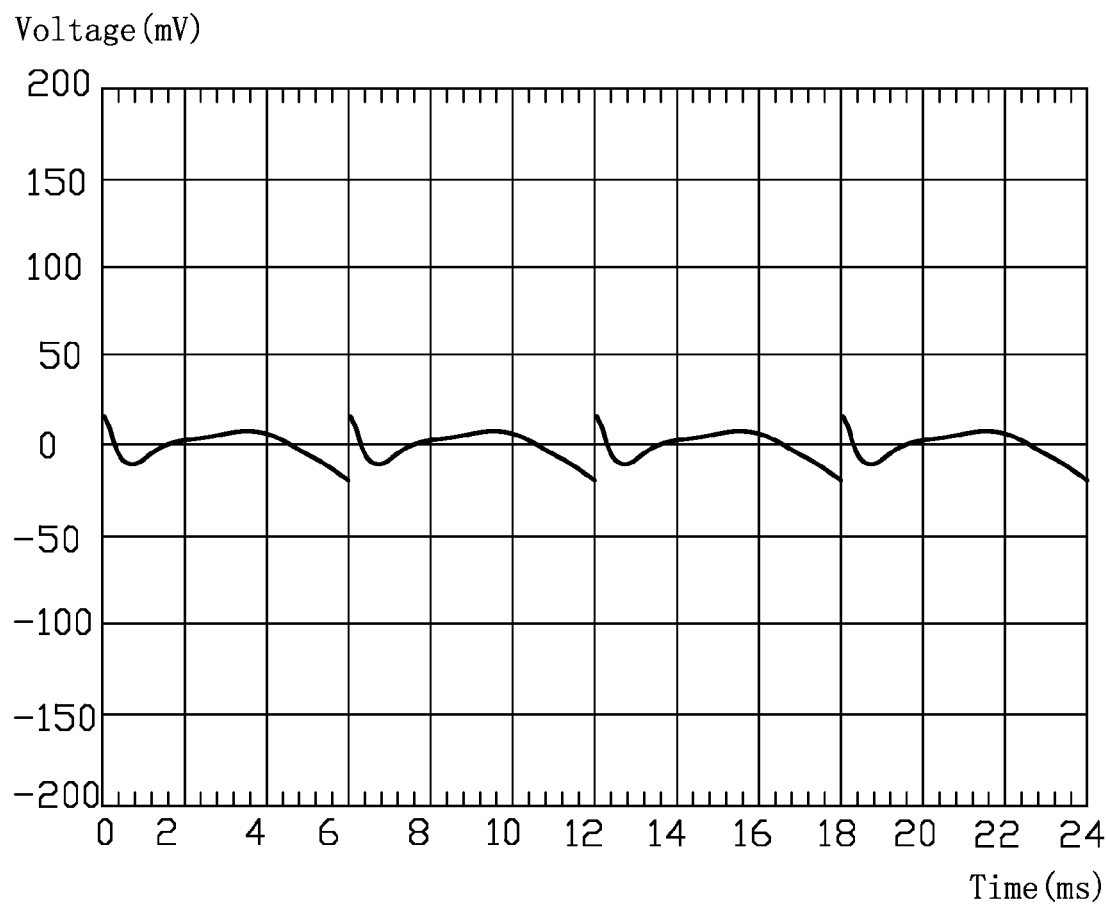
FIG. 2 is a graph showing voltage waveforms obtained by the oscilloscope of FIG. 1.

Referring to FIG. 1, the method includes the following steps:

Coupling a fan 20 and a resistor 40 in series to a power supply 10;

Coupling an oscilloscope in parallel with the resistor 40;

Powering up the circuit as shown in FIG. 1, and plotting voltage across the resistor 40 on a screen of the oscilloscope, and obtaining the period of the voltage signal, referring to FIG. 2, in the embodiment, the period of the voltage signal is 12 ms;

Obtaining the rotation speed of the fan 20 using the following formula:

$$Speed=60*1000/T$$

wherein T denotes the period of the voltage signal. The speed of the fan 20 in FIG. 2 is 60*1000/12=5000 rotations per minute.

Figure 3:
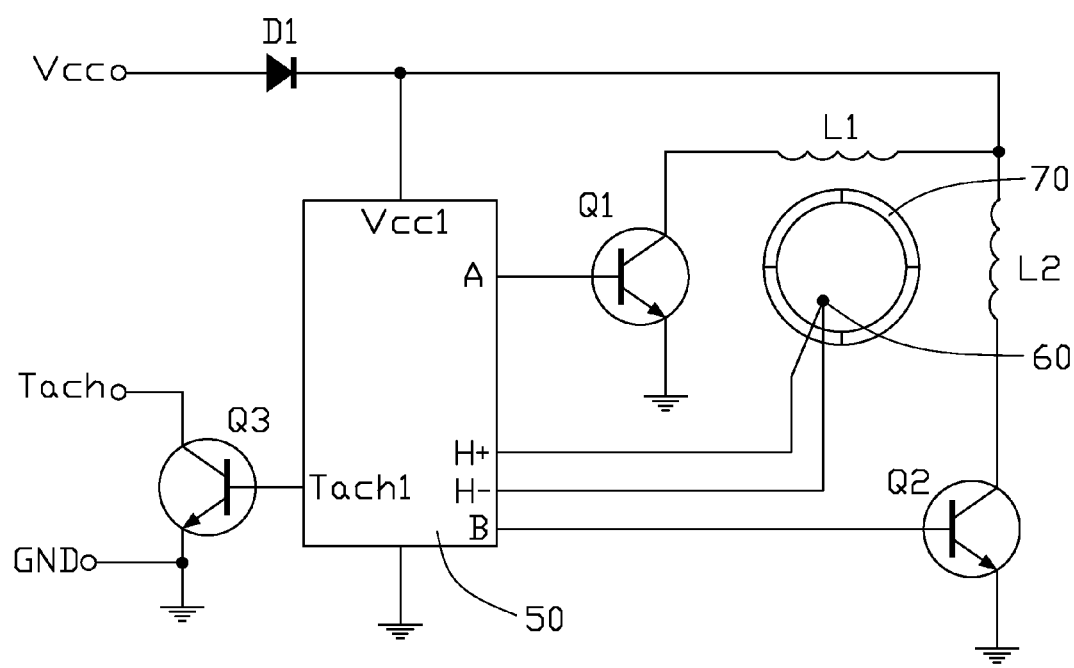
FIG. 3 is a circuit diagram of a control circuit of the fan of FIG. 1.

The theory of using the method to test the speed of the fan is as follows. Referring to FIG. 3, a control circuit of a fan 20 is shown. The control circuit includes an operation circuit 50, two windings L1, L2, three transistors Q1, Q2, Q3, a Hall element 60, and a magnetic ring 70. The magnetic ring 70 includes two pairs of magnetic blocks having contrary polarities being alternatively arranged in a circle. A power supply Vcc is connected to a Vcc1 pin of the operation circuit 50 via a diode D1, the windings L1, L2 each has an end connected to the VCC1 pin of the operation circuit 50. Another end of the winding L1 is connected to a collector of the transistor Q1, a base of the transistor Q1 is connected to a pin A of the operation circuit 50, and an emitter of the transistor Q1 is grounded. Another end of the winding L2 is connected to a collector of the transistor Q2, a base of the transistor Q2 is connected to a pin B of the operation circuit 50, and an emitter of the transistor Q2 is grounded. Pins H+, H− of the operation circuit 50 are connected to the Hall element 60. Pin Tach1 of the operation circuit 50 is connected to a base of the transistor Q3, a collector of the transistor Q3 receives a fan speed control signal Tach, the emitter of the transistor Q3 acts as a GND terminal of the control circuit 50 and is grounded. The two transistors Q1 and Q2 are made to alternately conduct by the operation circuit 50 to alternately energize the two windings L1, L2 for driving the magnetic ring 70 and fan blades to rotate (the fan blades are attached to and moveable with the magnetic ring 70). The Hall element 60 serves as a sensor and controller, the Hall element 60 detects the switching of the polarities of the magnetic field and generates different voltage levels at the pin H+, H− that alternately energizes the two windings L1 and L2 via the transistors Q1 and Q2.

When the fan 20 is powered on, one of the transistors Q1 and Q2 will be turned on firstly. Providing transistor Q1 is turned on firstly, the transistor Q2 is turned off. The power supply Vcc provides voltage to the diode D1, winding L1, and the transistor Q1, a magnetic field is generated when the current through the winding L1 changes, and a generated magnetic force drives the magnetic ring 70 and the fan blades to rotate. When the Hall element 60 detects polarity of the magnetic ring 70 changing, the Hall element 60 sends a signal to the operation circuit 50 through the pins H+ or H− to turn off the transistor Q1, and turn on the transistor Q2, the power supply Vcc provides voltage to the diode D1, winding L2, and the transistor Q2, a polarity of the magnetic field around the magnetic ring 70 is changed, and the generated magnetic force drives the magnetic ring 70 and the fan blades go on rotating. The magnetic ring 70 goes round and round in this manner, and for each rotation of the magnetic ring 70, the polarity of the magnetic field changes two times. Because the windings L1 and L2 have inductance characteristics, the current through the windings L1 and L2 can not change suddenly, induced voltage generated in the circuit as shown in FIG. 3 periodically changes. So, the speed of the fan can be obtained by testing the voltage generated in the circuit.

Figure 4:
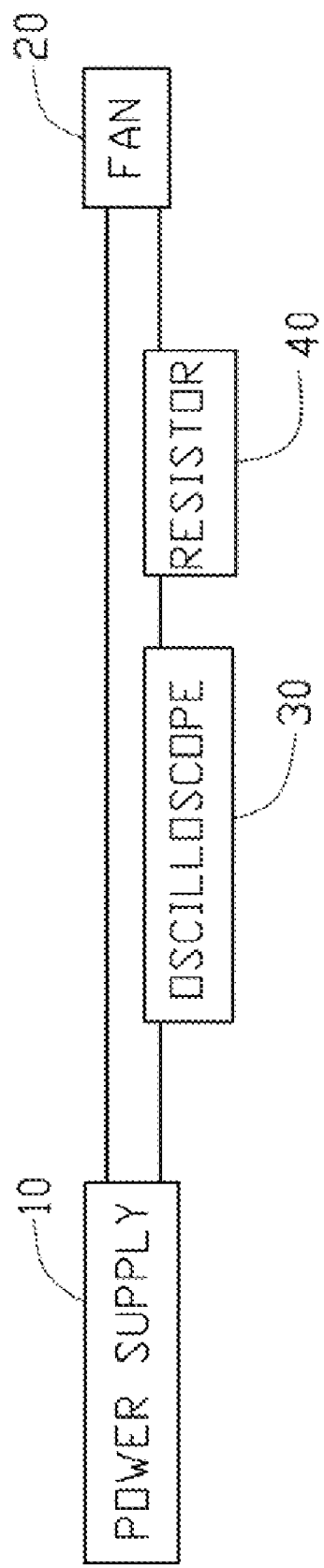
FIG. 4 is a schematic circuit diagram showing a method for testing rotation speed of a fan according to another embodiment of the present invention, utilizing an oscilloscope.

Referring to FIG. 4, in another embodiment, the oscilloscope 30 is connected in series with the fan 20 and the resistor 40 to plot the current of the control circuit of the fan 20. The period of the current is obtained, and the speed of the fan 20 can be obtained using the following formula: Speed=60*1000/T, wherein T denotes the period of the current.

The method of the present invention does not require the use of an expensive tachometer, the speed of the fan can be obtained by using an oscilloscope to plot the current or voltage of the control circuit. Therefore, the method of the present invention has low cost.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for testing rotating speed of a fan, comprising the following steps:
   coupling the fan and a resistor in series to a power supply;
   coupling an oscilloscope in parallel with the resistor;
   plotting a graph of the AC voltage between opposite ends of the resistor on a screen of the oscilloscope, and obtaining the period of the voltage according to the graph plotted on the screen; and
   obtaining the rotational speed of the fan by a formula: Speed =60*1000/T, wherein T denotes the period of the voltage in milliseconds.

2. A method for testing rotation speed of a fan, comprising the following steps:
   coupling the fan, an oscilloscope, and a resistor in series to a power supply;
   plotting a graph of the current through the resistor on a screen of the oscilloscope, and obtaining the period of the current according to the graph plotted on the screen; and
   obtaining the speed of the fan by a formula: Speed = 60*1000/T, wherein T denotes the period of the current in milliseconds.

* * * * *